United States Patent [19]
Braun et al.

[11] Patent Number: 5,300,171
[45] Date of Patent: Apr. 5, 1994

[54] CURABLE SILICONE PRESSURE SENSITIVE ADHESIVE TAPE AND BONDING METHOD EMPLOYING SAME

[75] Inventors: Joseph T. Braun, Midland; Joseph N. Clark, Freeland; Virgil J. Johnson, Bay City; Shawn K. Mealey; William J. Schoenherr, both of Midland, all of Mich.

[73] Assignee: Dow Corning Corporation, Midland, Mich.

[21] Appl. No.: 26,221

[22] Filed: Feb. 16, 1993

Related U.S. Application Data

[63] Continuation of Ser. No. 748,584, Aug. 22, 1991, abandoned.

[51] Int. Cl.$^5$ .............................................. B32B 31/00
[52] U.S. Cl. ................................ 156/249; 156/235; 156/313; 156/329; 427/208; 427/208.4; 428/40; 428/355; 525/477; 528/38
[58] Field of Search ................... 428/40, 355; 427/208, 427/208.4; 156/235, 313, 249, 329; 528/38; 525/477

[56] References Cited

U.S. PATENT DOCUMENTS

| | | | |
|---|---|---|---|
| 2,541,498 | 2/1951 | Calvert | 156/249 |
| 2,882,183 | 4/1959 | Bond et al. | 427/208 |
| 3,409,198 | 11/1968 | Peterman | 156/64 |
| 3,623,944 | 11/1971 | Davis | 156/235 |
| 3,881,290 | 5/1975 | Bouchey . | |
| 4,257,932 | 3/1981 | Beery | 156/329 |
| 4,396,675 | 8/1983 | Groff . | |
| 4,584,355 | 4/1986 | Blizzard et al. | 525/477 |
| 4,613,534 | 9/1986 | Blizzard et al. . | |
| 4,736,048 | 4/1988 | Brown et al. . | |
| 4,842,902 | 6/1989 | Brown et al. . | |
| 4,889,753 | 12/1989 | Brown et al. | 428/40 |
| 4,912,898 | 4/1990 | Holmes . | |
| 4,980,440 | 12/1990 | Kendziorski et al. . | |

FOREIGN PATENT DOCUMENTS

| | | | |
|---|---|---|---|
| 173303 | 5/1986 | European Pat. Off. . | |
| 236042 | 9/1987 | European Pat. Off. . | |
| 262968 | 6/1988 | European Pat. Off. . | |
| 370689 | 5/1990 | European Pat. Off. . | |
| 915742 | 1/1963 | United Kingdom | 156/313 |

OTHER PUBLICATIONS

Architect's Guide to Glass, Metal & Glazing (1985), pp. 48–54.
Klosowski, Mercel Deker, Inc. (1989) p. 248.

Primary Examiner—John J. Gallagher
Attorney, Agent, or Firm—James E. Bittell

[57] ABSTRACT

A pressure sensitive adhesive tape comprising a tape substrate having at least a portion of one or more sides coated with a silicone pressure sensitive adhesive is constructed using an adhesive which cures to a permanent adhesive. The adhesive is covered on the outer side with a release film, preferably coated with a fluorosilicone release layer, to allow storage of the tape. Preferably the curable silicone pressure sensitive adhesive is cured upon exposure to moisture, the tape therefore being stored in the absence of moisture. A silicone elastomeric structural glazing tape is made by using a silicone elastomer as the tape substrate. The tape can be used to bond glazing panels to building components without the use of other means of fastening.

15 Claims, 2 Drawing Sheets

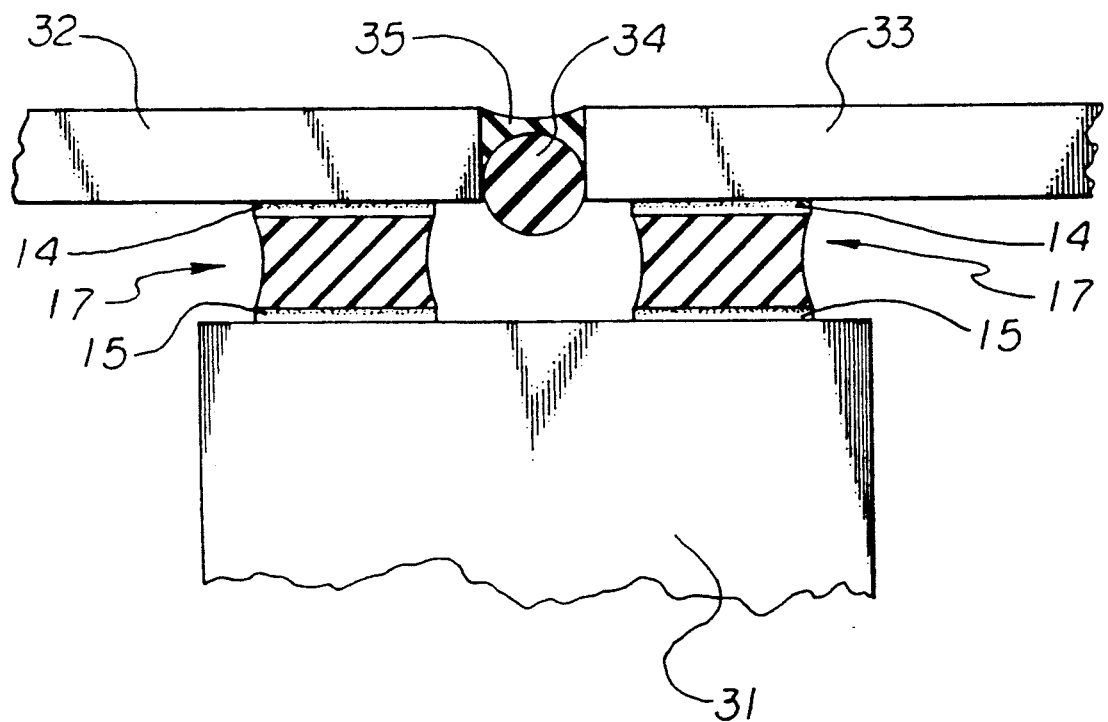

CURABLE SILICONE PRESSURE SENSITIVE ADHESIVE TAPE AND BONDING METHOD EMPLOYING SAME

This is a continuation of copending application Ser. No. 07/748,584 filed on Aug. 22, 1991, now abandoned.

BACKGROUND OF THE INVENTION

1. Field of the Invention

This invention relates to curable silicone pressure sensitive adhesive tape useful for bonding in structural applications.

2. Background Information

Many methods of using adhesives for bonding the various components of buildings together have been developed. Adhesives have been used in the manufacture and attachment of exterior panels in curtain walls, such as in structural glazing systems.

A system for use in structural glazing has been developed in which an adhesive sealent has been used to bond the glass exterior panel to the curtain wall frame and to seal the joint formed. A discussion of such a system is found in "The Role of Adhesive Sealants in Structural Glazing", Architects's Guide to Glass, Metal & Glazing, Annual Edition, 1985, p 48–54. The system discussed makes use of silicone sealants which bond curtainwall components together. The components must be held in place while the silicone sealant cures to an elastomeric material from the paste material it is at the time of application.

A variation of the above system is described in "Sealants in Construction", Klosowski, Marcel Deker, Inc, New York, N.Y., 1989, at page 248. The backing material used to form the joint between metal frame and glass curtain in a factory during construction of the assembly is a urethane foam tape. This foam tape has a pressure sensitive adhesive on two sides. The tape is applied to the frame as a gasket, then the glass placed over it. The adhesive holds the glass in place while a silicone sealant is installed between the frame and glass and allowed to cure, to permanently bond the two pieces together.

Another system has been developed in Japan which uses a thin layer of silicone sealant to bond the glass sheet to a silicone rubber gasket, which is in turn secured by a metal holder which is bolted to the structural part of a building to attach the glass curtain to the building. The gasket is bonded to the glass in a factory, as the assembly must have several days to cure and bond before it is attached to the building.

A glazed impervious sheet assembly and method of glazing are described in U.S. Pat. No. 3,881,290, issued May 6, 1975. The method makes use of a pressure sensitive resilient tape to seal between an exterior stop and the impervious sheet. Shown is a suitable polyvinyl chloride foam ribbon and silicone pressure sensitive adhesive useful in the method.

Glass butt joints for curtain wall construction are taught in U.S. Pat. No. 4,912,898, issued Apr. 3, 1990. The construction uses an insulating panel unit made up of two parallel sheets which are separated by use of a spacer and bonded together by a sealing means, such as polysulphide, butyl, and silicone compounds. Metal brackets are factory attached to the insulating panel unit with sealant, which is cured before installation of the panels into the building. After installation, a sealant is used to seal the space between units.

None of the above described systems can be used to bond two surfaces together through the use of a pressure sensitive adhesive with sufficient long term integrity so that support brackets are not necessary either during assembly or during use.

A pressure sensitive adhesive tape is described in U.S. Pat. No. 4,396,675, issued Aug. 2, 1983. The tape is applied to a surface and is then heated to crosslink the adhesive. The crosslinked adhesive exhibits excellent resistance to common organic solvents and exceptional resistance to shear failure, especially at elevated temperatures.

A method of bonding surfaces with a permanent-bond adhesive is taught in U.S. Pat. No. 4,613,534, issued Sep. 23, 1986. The method bonds surfaces coated with elastoplastic organopolysiloxane resin or polytetrafluoroethylene resin. The adhesive is a multi-part composition which cures when the parts are mixed together and the solvent is removed. The adhesive does not make a pressure sensitive adhesive.

When pressure sensitive adhesives are used as tapes, they are commonly protected when formed into rolls with a releasable liner which has a coating which does not adhere to the pressure sensitive adhesive. A coating composition which is useful in this manner is described in U.S. Pat. No. 4,736,048, issued Apr. 5, 1988, while the method of coating this composition to make such a releasable liner is claimed in U.S. Pat. No. 4,842,902, issued Jun. 27, 1989. U.S. Pat. No. 4,889,753, issued Dec. 26, 1989, claims a releasable liner and a laminate of the liner and pressure sensitive adhesive. Another such composition is described in U.S. Pat. No. 4,980,440, issued Dec. 25, 1990. This composition is stated to have a faster curing time and a longer bath life.

In co-pending applications for U.S. patent, titled "SOLUTION-STABLE, MOISTURE-CURABLE SILICONE PRESSURE SENSITIVE ADHESIVES", U.S. patent application Ser. No. 07/748,477, and "STABLE, MOISTURE-CURABLE SILICONE PRESSURE SENSITIVE ADHESIVES", U.S. patent application Ser. No. 07/748,500 filed on even date herewith and assigned to the assignee of this application, there are disclosed and claimed moisture-curable silicone pressure sensitive adhesive (SPSA) compositions. The use of these SPSA compositions would be greatly enhanced if they could be protected in thin film form with a release liner. The disclosures of said co-pending and co-assigned applications are incorporated herein by reference to fully delineate these SPSA compositions and how to prepare them.

Tangney, U.S. Ser. No. 276,178, filed on Nov. 23, 1988 and assigned to the assignee of this application disclosed a laminate article comprising a fluorosilicone release liner and an addition-cured SPSA.

SUMMARY OF THE INVENTION

A method of permanently bonding two surfaces together comprises placing the surfaces in proximity, then placing in contact with both surfaces a curable pressure sensitive adhesive tape so that each of the two surfaces is in contact with at least a portion of the silicone pressure sensitive adhesive, then curing the adhesive. The pressure sensitive adhesive tape comprises a tape substrate having one or more sides coated with a curable silicone pressure sensitive adhesive, the pressure sensitive adhesive being curable to a permanent adhesive. A preferred curable silicone pressure sensitive adhesive is one which is moisture-curable.

The use of the adhesive tape described in this invention makes possible the construction of a curtain wall in one step, rather than the two step process currently in use; the use also results in minimum use of sealing material, saving on the cost of construction.

By the term "silicone pressure sensitive adhesive" it is meant an adhesive comprising one or more siloxane components and possessing sufficient tack and cohesive strength so that it can be adhered with mild pressure to a clean stainless steel substrate and then removed therefrom and adhered to the same or another clean substrate. By the term "permanent adhesive" it is meant an adhesive that bonds to a clean substrate and cannot be so removed and thereafter readhered.

BRIEF DESCRIPTION OF THE DRAWINGS

FIG. 3 is a partial cross section of a curtain wall construction.

DESCRIPTION OF THE INVENTION

This invention relates to a pressure sensitive adhesive tape comprising a tape substrate having at least a portion of one or more sides coated with a curable silicone pressure sensitive adhesive, the pressure sensitive adhesive being one which can be rebonded to a surface after being removed from a surface, the silicone pressure sensitive adhesive being curable to a permanent adhesive, the permanent adhesive being an adhesive which can not be rebonded to the surface after being removed. The pressure sensitive adhesive tape is used in a method of permanently bonding two surfaces together comprising placing the surfaces in proximity, then placing in contact with both surfaces a pressure sensitive adhesive tape comprising a tape substrate having at least a portion of one or more sides coated with a silicone pressure sensitive adhesive, which is curable to a permanent adhesive, so that each of the two surfaces is in contact with at least a portion of the curable silicone pressure sensitive adhesive, then curing the silicone pressure sensitive adhesive to bond the two surfaces together in a permanent manner.

Figure 1:
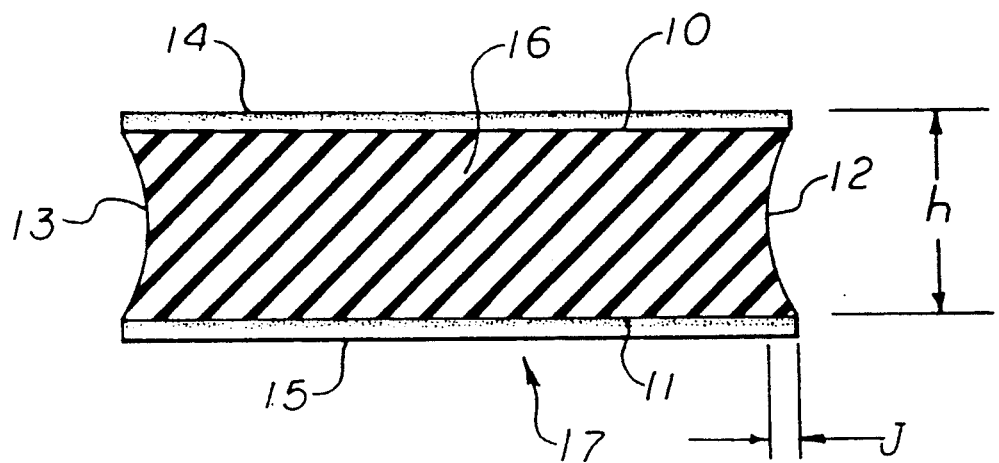
FIG. 1 is a cross section of pressure sensitive adhesive tape having curable silicone pressure sensitive adhesive on the bearing surfaces.

Further description of this invention is by way of referral to the drawings. FIG. 1 shows a cross section of a preferred tape having an elongated member 16 having a rectangular shape. The two opposing bonding surfaces 10 and 11 are shown as flat and parallel in this figure. The two opposing non-bonding surfaces 12 and 13 are flat or concave, h and J being the length and height used to describe the concave surface 12 as shown. The non-bearing surfaces are preferably concave as this shape has been found to reduce the peel stress on the corners of the tape when assembled into a curtain wall construction. Elongated member 16 is preferably constructed of a silicone elastomer having the physical properties desired for the tape in order for it to function properly in the particular application. Elongated member 16 can be constructed of any material which is appropriate for the application being considered. The bonding surfaces 10 and 11 are coated with a layer of curable pressure sensitive silicone adhesive 14 and 15. The outer surfaces of curable pressure sensitive silicone adhesives 14 and 15 are covered by a release liner or sheet, not shown, while the tape is in storage. This adhesive is a pressure sensitive adhesive so that the tape can be applied to a surface to be bonded to by merely removing the tape from the storage container and pressing into place on the first surface to be bonded to. After application to the first surface, a protective release liner, not shown in FIG. 1, is removed and a second surface to be bonded to is placed over the adhesive surface of the tape and forced against the adhesive 14. Because of the pressure sensitive nature of the adhesive 14, the second surface is immediately held in place without any further need of additional mechanical fasteners to provide temporary support while the adhesive cures. When the construction is completed, the adhesive 14 and 15 on the tape 16 is cured. The cured adhesive bonds the two surfaces together, through the tape 16, with a permanent, structurally sufficient strength to hold the construction in place. There is no need for temporary mechanical supports at any time during the process of assembling the curtain wall, nor is there need for mechanical supports during the life of the curtainwall.

Figure 2:
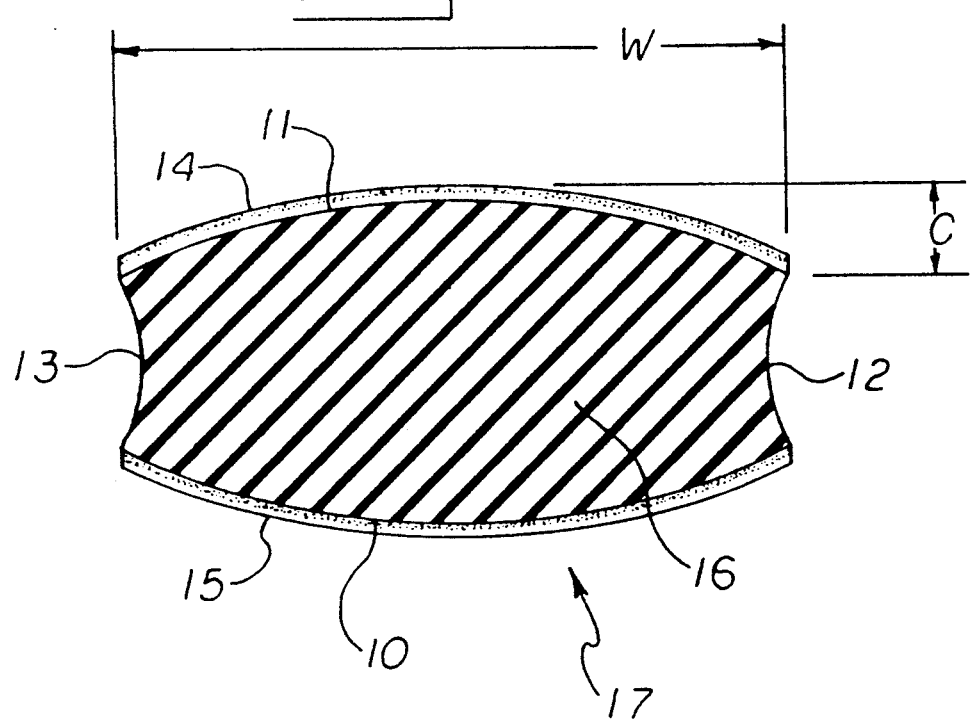
FIG. 2 is a cross section of an alternate design of tape.

FIG. 2 shows optional features which may be used in the construction of the tape. Bearing surfaces 10 and 11 may be convex, with the maximum height c of the convex surface less than 1.2 percent of the width w of the surface. The convex surface is useful in obtaining a uniform, bubble free joined surface between the adhesive 14 and an overlaying panel in the finished construction. As the panel is placed over the tape and pressed into place, the higher portion of the tape at the center causes air present between the adhesive surface and the panel surface to be forced out. The height of the convex surface is held to a maximum since too great a height would cause a concentration of forces at the center of the tape from the compression of the tape as the overlaying panel is forced down into contact with the tape. When the applying force is removed, the compressive forces at the center of the tape will tend to force the panel away from the tape, possibly causing failure of the bond at the edges of the tape.

The preferred adhesive used in constructing the tape is a moisture-curable pressure sensitive silicone adhesive. This adhesive is preferred because it gives the immediate structural performance necessary to allow two surfaces to be bonded together due to the pressure sensitive nature of the adhesive. After the surfaces are bonded together, the adhesive cures to produce a permanent adhesive which securely bonds the surfaces together through the tape. The tape substrate and the adhesive both have the long life required in practical applications.

A use of the pressure sensitive adhesive tape of FIG. 1 is illustrated in FIG. 3, showing construction of a curtain wall.

The frame member 31 is a structural part of the building curtain wall. The curtain wall panels 32 and 33 are attached to the frame member 31 by use of the pressure sensitive adhesive tape 17. The adhesive layers 14 and 15 on the bearing surfaces of the tape 17 bond the panels 32 and 33 to the frame 31. Optionally, an elastomeric backer rod 34 is placed between the panels 32 and 33 and a weather sealant 35 is extruded into place to seal the space between the panels 32 and 33.

The elongated member 16 can be composed of any material that possesses the required rheological properties needed for performance in the structural application. The preferred material for curtainwall applications is a silicone rubber with a Shore A durometer of about 30 and 70. An elastomeric material such as this allows a tape to be made which can be formed and stored in roll form. The elongated member could be a rigid material, which means it would have to be handled from a practical point of view as a series of pieces which would be put in place, but the idea of a method of permanently bonding two surfaces together through the use of a curable pressure sensitive adhesive tape is still present.

The silicone pressure sensitive composition, curable to a permanent adhesive in the presence of moisture (SPSA), comprises a silicone pressure sensitive adhesive component bearing curing radicals having the formula $R_b(OR')_{3-b}SiZ-$ wherein Z denotes a divalent radical linking the silicon atom of the curing radical to a silicon atom of the silicone pressure sensitive adhesive component, R denotes a monovalent hydrocarbon radical, R' denotes an alkyl or alkoxyalkyl radical, and the subscript b has a value of 0 or 1; all other silicon-bonded radicals of the silicone pressure sensitive adhesive component being selected from the group consisting of divalent oxygen atoms linking silicon atoms, hydroxyl radicals, hydrogen atoms and monovalent hydrocarbon radicals; and an effective amount of a catalyst component to accelerate the reaction of the curing radicals with moisture to form siloxane bonds.

The SPSA component bearing curing radicals consists essentially of a SPSA composition which has been modified so that it bears one or more silicon-bonded radicals of the formula $R_b(OR')_{3-b}SiZ-$. In the formula for the curing radicals R, when present, can be any monovalent hydrocarbon radical having, for example, from 1 to 10, preferably 1 to 6, carbon atoms, such as lower alkyl radicals exemplified by methyl, ethyl, propyl and isopropyl; alkenyl, such as vinyl; and aryl, such as phenyl. To obtain maximum curing rates for the adhesive compositions of this invention it is preferred that the value of b in the curing radical formula is zero. When b is 1 R is preferably the methyl radical.

In the formula for the curing radical R' denotes any alkyl or alkoxyalkyl radical, preferably having less than 5 carbon atoms, such as methyl, ethyl, iopropyl, methoxyethyl, or ethoxyethyl. R' is preferably methyl.

In the formula for the curing radical Z denotes a divalent radical which durably links the silicon atom of the curing radical to a silicon atom of the silicone pressure sensitive adhesive. Z is to be linked to the silicon atom of the curing radical and to the silicon atom of the pressure sensitive adhesive so that the curing radical is not removed from the SPSA component during moisture-curing of the SPSA. Z has no other known requirements.

Z is typically selected from the types of divalent radicals that are used to link silicon atoms in a hydrolytically stable manner and include, for example, oxygen; hydrocarbon, such as alkylene, exemplified by ethylene, propylene and isobutylene, and phenylene; hydrocarbon containing one or more hetero atoms selected from oxygen, nitrogen and sulfur, such as ether-, thioether-, ester- or amide-containing hydrocarbon; siloxane, such as polydimethylsiloxane; and combinations thereof.

Preferably, Z is selected from the group of radicals having the formula $-(C_2H_4SiMe_2)_x(OSiMe_2)_yD-$. Herein Me denotes methyl and D denotes oxygen or $C_2H_4$. The value of the subscript x can range from 0 to 2, preferably 1, and the subscript y can range from 0 to 6, preferably 0 or 1, each both inclusive, and the sum of x+y is zero or more.

Preferred Z include silhydrocarbonsiloxane linkages, such as $-(OSiMe_2)CH_2CH_2-$, $-(CH_2CH_2SiMe_2)(OSiMe_2)CH_2CH_2-$, $-(CH_2CH_2SiMe_2)O-$, and $-(CH_2CH_2SiMe_2)(OSiMe_2)O-$; silhydrocarbon linkages, such as $-(CH_2CH_2SiMe_2)CH_2CH_2-$ and $-CH_2CH_2-$; and siloxane linkages, such as $-(OSiMe_2)O-$ and $-O-$.

Specific examples of suitable curing radicals include, but are not limited to $(MeO)_3SiCH_2CH_2-$, $(MeO)_3SiO-$, $Me(MeO)_2SiO-$, $(MeO)_3SiCH_2CH_2SiMe_2CH_2CH_2SiMe_2O-$, $(MeO)_3SiCH_2CH_2SiMe_2O-$, $(MeO)_3SiCH_2CH_2SiMe_2OSiMe_2O-$, and $(MeO)_3SiCH_2CH_2SiMe_2OSiMe_2CH_2CH_2-$.

Herein the ethylene radical is sometimes written as $C_2H_4$ to indicate the isomeric mixture of $CH_2CH_2$ and $CH_3CH$ linkages that are obtained when an hydrosilylation reaction between a silicon-bonded vinyl radical and a silicon-bonded hydrogen atom occurs. For example, the formula $(MeO)_3SiC_2H_4SiMe_2O-$ is to be construed as encompassing $(MeO)_3SiCH_2CH_2SiMe_2O-$ and/or $(MeO)_3SiCH(CH_3)SiMe_2O-$.

Silicon-bonded radicals of the silicone pressure sensitive adhesive component which are not curing radicals having the formula indicated are selected from divalent oxygen atoms linking silicon atoms and monovalent radicals selected from hydroxyl radicals, hydrogen atoms and the hydrocarbon radicals noted above for R.

The SPSA component of the compositions of this invention bearing curing radicals can be prepared by introducing the required curing radicals, in any desired sequence, into a preformed SPSA and/or into one or more of the siloxane components of the SPSA, by way of reactive sites, such as silicon-bonded hydroxyl or vinyl radicals, therein.

SPSA compositions which can be used to prepare the SPSA component of the compositions of this invention comprise (1) an organopolysiloxane resin and (2) a polydiorganosiloxane gum. The weight ratio of resin (1) to gum (2) in the SPSAs ranges from 5/95 to 70/30, preferably 40/60 to 60/40. The silicon-bonded radicals of these SPSAs are selected from the group consisting of divalent oxygen atoms linking silicon atoms, hydroxyl radicals, and monovalent hydrocarbon radicals, such as alkyl, aryl, alkenyl, cycloalkyl, cycloalkenyl, aralkyl and alkaryl; and hydrogen atoms.

The organopolysiloxane resin (1) consists essentially of $R^1_3SiO_{\frac{1}{2}}$ siloxane units and $SiO_{4/2}$ siloxane units and can be dissolved, substantially completely, in either a hydrocarbon liquid such as benzene, toluene, xylene, heptane and the like or in a silicone liquid such as a low viscosity cyclic or linear polydiorganosiloxanes.

In the $R^1_3SiO_{\frac{1}{2}}$ siloxane units $R^1$ denotes a monovalent hydrocarbon radical preferably having less than 20 carbon atoms, and most preferably having from 1 to 10 carbon atoms, a hydroxyl radical or a hydrogen atom.

Examples of suitable hydrocarbon $R^1$ radicals include alkyl radicals, such as methyl, ethyl, propyl, pentyl, octyl, undecyl and octadecyl; alkenyl radicals, such as vinyl, allyl and 5-hexenyl; cycloaliphatic radicals, such as cyclohexyl and cyclohexenylethyl; and aryl radicals such as phenyl, tolyl, xylyl, benzyl and 2-phenylethyl.

At least one-third, and more preferably substantially all $R^1$ radical, in the formula for component (1) are methyl radicals. Examples of preferred $R^1_3SiO_{\frac{1}{2}}$ siloxane units include $HMe_2SiO_{\frac{1}{2}}$, $Me_3SiO_{\frac{1}{2}}$, $PhMe_2SiO_{\frac{1}{2}}$ and $Me_2ViSiO_{\frac{1}{2}}$ where Me, Ph and Vi denote methyl, phenyl and vinyl.

The mol ratio of the $R^1_3SiO_{\frac{1}{2}}$ siloxane units to $SiO_{4/2}$ siloxane units of component (1) has a value of from 0.5/1 to 1.5/1, preferably from 0.6/1 to 0.9/1. These mol ratios are easily measured by $Si^{29}$ n.m.r. Spectroscopy.

Component (1) consisting essentially of $R^1{}_3SiO_{\frac{1}{2}}$ siloxane units and $SiO_{4/2}$ siloxane units can be prepared by any suitable method. That is to say, it is believed that the organopolysiloxane resin (1) can be prepared by, for example, silane co-hydrolysis methods or silica hydrosol capping methods known in the art. Component (1) is preferably prepared by the silica hydrosol capping processes of Daudt, et. al., U.S. Pat. No. 2,676,182; of Rivers-Farrell et al., U.S. Pat. No. 4,611,042; and of Butler, U.S. Pat. No. 4,774,310; each incorporated herein to teach how to prepare organopolysiloxane resins which can be reacted to contain curing radicals or which can be used to make SPSAs which can be reacted to contain curing radicals.

Component (2) of the SPSA component to be converted to contain curing radicals is a polydiorganosiloxane gum having the general formula $R^3R^2{}_2SiO(R^2{}_2SiO)_nSiR^2{}_2R^3$. In this formula each $R^2$ denotes a hydrogen atom or a monovalent hydrocarbon radical and each $R^3$ denotes a radical selected from the group consisting of $R^2$ radicals and OH radicals. Examples of $R^2$ radicals include the hydrocarbon radicals delineated above for $R^1$, including preferred species.

At least 50%, and preferably at least 90%, of the $R^2$ radicals of Component (2) are methyl radicals. The methyl radicals can be distributed in any preferred manner in the polydiorganosiloxane. General examples of polydiorganosiloxanes which are suitable for use as component (2) in the compositions of this invention include hydroxyl-, hydrogen- and hydrocarbon-terminated polydiorganosiloxanes. Specific examples of these polydiorganosiloxane include, but are not limited to, the polydiorganosiloxanes in the examples disclosed below and $ViMe_2SiO(Me_2SiO)_nSiMe_2Vi$, $ViMe_2SiO(Me_2SiO)_{0.98n}(MeViSiO)_{0.02n}SiMe_2Vi$, $Me_3SiO(Me_2SiO)_{0.9n}(MeViSiO)_{0.1n}SiMe_3$, $HMe_2SiO(Me_2SiO)_n SiMe_2H$, $Me_3SiO(Me_2SiO)_{0.9n}(MeHSiO)_{0.1n}SiMe_3$, $HOMe_2SiO(Me_2SiO)_nSiMe_2OH$, and $HOR^2{}_2SiO(Me_2SiO)_{0.95n}(MeViSiO)_{0.05n}SiR^2{}_2OH$, wherein Me, Vi and Ph denote methyl, vinyl and phenyl, respectively.

The average values of the subscript n in the above formulae are such that the organopolysiloxane component (2) has a viscosity at 25 C of from 100,000 centipoise (100 pascal-seconds) to 100,000,000 centipoise (100 kilopascal-seconds) and more. The exact value of the subscript n needed to provide a viscosity value falling within said limits depends upon the identity of the $R^2$ radicals; however, for hydroxyl-terminated and-/or $R^2$-terminated polydiorganosiloxanes containing at least 90% methyl radicals n will have a value of from about 1 to several thousand. From a consideration of maximum adhesive properties, component (2) is preferably a gum having a viscosity of at least 1,000,000 centipoise at 25 C.

Component (2) can comprise trace amounts of siloxane branching sites, such as $R^2SiO_{3/2}$ units and $SiO_{4/2}$ units, and can be comprised of a single polydiorganosiloxane or a mixture of two or more different polydiorganosiloxanes, if desired.

Polydiorganosiloxanes are well known in the organosilicone art and their synthesis needs no extensive delineation herein. Many are commercially available from major silicone manufacturers.

SPSAs having sites of the formula $\equiv SiOH$, herein also denoted as a silanol-functional SPSA, can be any of those known in the art. The disclosures of U.S. Pat. Nos. 2,736,721; 2,814,601; 2,857,356; 3,527,842; 3,528,940; 3,839,075; 3,929,704; 3,983,298; 4,309,520; 4,584,355; 4,591,622; and 4,774,297 are incorporated herein by reference to illustrate silanol-functional SPSAs that can be used to prepare the moisture-curable SPSA component of the compositions of this invention.

SPSAs having sites of the formula $\equiv Si$-alkenyl, herein also denoted as an alkenyl-functional SPSA, can be prepared, for example, by replacing one or more of the silanol-functional components normally used to prepare a silanol-functional SPSA compositions known in the art with an alkenyl-functional component.

SPSAs having sites of the formula $\equiv SiH$, herein also denoted as an hydrogen-functional SPSA, can be prepared, for example, by replacing one or more of the silanol-functional components normally used to prepare a silanol-functional SPSA compositions known in the art with an hydrogen-functional component.

A preferred SPSA composition to be used to prepare the SPSA component of the compositions of this invention is a bodied SPSA composition. A bodied SPSA composition can be prepared by heating a solution of a silanol-functional SPSA in a solvent, such as a water-azeotroping hydrocarbon, at reflux until its silanol content has been reduced, preferably to a value of less than one weight percent.

The SPSA component of this invention bearing curing radicals can be prepared by a method wherein an $\equiv SiX$- functional SPSA is reacted with a compound that will convert one or more $\equiv SiX$ groups in the SPSA to a curing radical having the formula noted above. As noted above, the curing radicals can be introduced into the organopolysiloxane resin portion, into the polydiorganosiloxane gum portion, into the SPSA after it has been prepared, or into any combination of said portions and SPSA. It should be understood that at least the polydiorganosiloxane gum or the organopolysiloxane resinous portion or the SPSA composition made therefrom must contain a sufficient number of $\equiv SiX$ reactive site to accomodate the introduction of the needed curing radicals.

Accordingly, in a second embodiment the present invention relates to a method comprising: reacting (i) a silicone pressure sensitive adhesive composition having reactive sites of the formula $\equiv SiX$ with (ii) a moisture-reactive compound having the formula $R_b(OR')_{3-b}SiY$ wherein Y denotes a radical which is reactive with $\equiv SiX$, whereby the Y- substituted silicon atom is linked with the X-substituted silicon atom by a divalent Z radical, R denotes a monovalent hydrocarbon radical, R' denotes an alkyl or alkoxyalkyl radical, and the subscript b has a value of 0 or 1; all other silicon-bonded radicals in (i) being selected from the group consisting of divalent oxygen atoms linking silicon atoms, hydrogen atoms, hydroxyl radicals and monovalent hydrocarbon radicals.

The SPSA component bearing curing radicals having the formula $R_b(OR')_{3-b}SiZ$— can be prepared by any method wherein the Y radical of $R_b(OR')_{3-b}SiY$ reacts with an X radical of an X-substituted SPSA to form a Z radical, as noted above. The method for forming a Z radical can encompass the reactions of silicon chemistry, such as the reaction of silanols or of silicon hydrides; or of organic chemistry, such as the reaction of an alcohol with a carboxylic acid to form an ester linkage. Conveniently, for this purpose, one can adapt one or more of the several methods which are disclosed in the art for preparing moisture-curable silicone elastomers and/or sealants and U.S. Pat. Nos. 3,122,522; 3,161,614 (Re 29,760); 3,175,993; 3,334,067; 4,100,129; 4,395,526; 4,599,394; 4,772,675; 4,847,400; and 4,962,174 are incorporated herein by reference to show the preparation of moisture-curable compositions which comprise silicon-bonded alkoxy groups and a catalyst.

In particular the disclosures of Weyenberg, U.S. Pat. No. 3,175,993; Lucas, U.S. Pat. No. 4,599,394; Klosowski and Meddaugh, U.S. Pat. No. 4,772,675; Krahnke and Saam, U.S. Pat. No. 4,847,400; and Bilgrien and Berg, U.S. Pat. No. 4,962,174 are noted for the preparation of the SPSA component bearing silicon-bonded curing radicals having the formula formula $Me_b(MeO)_{3-b}SiC_2H_4SiMe_2(OSiMe_2)_yD$— wherein y has an average value of from 0 to 6, preferably 0 to 1, each both inclusive.

The SPSA component bearing curing radicals can be prepared by the application of any of the above-noted processes to SPSA compositions and/or to one or more of their several components. Briefly, these methods comprise hydrosilylation reactions and silanol-converting reactions; the latter comprising the reaction of a silanol group with a silicon-bonded hydrolyzable radical such as amine, silylamine, alkoxy, halogen or acyloxy; or with a silicon-bonded hydrogen atom.

For example, $(MeO)_3SiCH_2CH_2$— radicals and $(MeO)_3SiCH_2CH_2SiMe_2OSiMe_2CH_2CH_2$— radicals can be introduced into a vinyl radical-containing SPSA component with compounds having the formula $(MeO)_3SiH$ and $(MeO)_3SiCH_2CH_2SiMe_2OSiMe_2H$, respectively. In this example Y=H or $CH_2CH_2SiMe_2OSiMe_2H$, respectively, and $X=CH_2=CH$—.

Radicals having the formulae $(MeO)_3SiO$— and $Me(MeO)_2SiO$— can be introduced into a silanol-functional SPSA component with compounds having the formulae $(MeO)_4Si$ and $Me(MeO)_3Si$, respectively. Alternatively, compounds having the formulae $(MeO)_3SiH$ and $Me(MeO)_2SiH$, respectively, can be used. In these examples Y=MeO— or H, respectively, and X=OH.

$(MeO)_3SiCH_2CH_2SiMe_2O$—, $(MeO)_3SiCH_2SiMe_2OSiMe_2O$— and $(MeO)_3SiCH_2CH_2SiMe_2CH_2CH_2SiMe_2O$— radicals can be introduced into a silanol-functional SPSA component by the use of compounds such as $(MeO)_3SiCH_2CH_2SiMe_2OSiMe_2H$, $(MeO)_3SiCH_2CH_2SiMe_2CH_2CH_2SiMe_2H$ and $(MeO)_3SiCH_2CH_2SiMe_2H$.

Most conveniently, the SPSA component bearing curing radicals having the formula $R_b(OR')_{3-b}SiZ$— is prepared by reacting a silanol-containing SPSA with a moisture-reactive compound having the formula $R_b(OR')_{3-b}SiY$ wherein Y bears a silicon-bonded hydrolyzable radical such as halogen, acyloxy, amino, amido, etc. In view of the type of by-products that are produced during the reaction Y preferably bears an amino nitrogen which provides an ammonia by-product.

Silazanes and disilazanes are preferred compounds for introducing the curing radicals into a silanol-functional SPSA, in view of the type of by-products that will produced during the reaction. Examples of silazanes and disilazanes include $(MeO)_3Si(CH_2CH_2SiMe_2)_x(OSiMe_2)_yNH_2$ and $\{(MeO)_3Si(CH_2CH_2SiMe_2)_x(OSiMe_2)_y\}_2NH$, such as $\{(MeO)_3SiCH_2CH_2SiMe_2\}_2NH$, where x can range from 0 to 2, preferably 1, and y can range from 0 to 6, preferably 0 or 1, each both inclusive, and the sum of x plus y is zero or more. An highly preferred curing radical for the composition of this invention is $(MeO)_3SiC_2H_4SiMe_2O$— because it can be readily introduced into the SPSA composition by way of its disilazane. The SPSA component bearing silicon-bonded curing radicals having the formula $R_b(OR')_{3-b}SiZ$— can bear any number of curing radicals; the rate and extent of cure of the SPSA composition, when exposed to moisture, being dependent on the concentration of curing radicals.

It is believed at this time that the SPSA component should contain an average of at least 1 millimol, preferably at least 2 millimols, of curing radicals per 100 parts by weight of SPSA component to obtain a desirable rate of cure. On the other hand it is currently believed that the SPSA component should contain no more than 100, preferably no more than 50, millimols of curing radicals per 100 parts of SPSA component to achieve a desirable adhesive strength. Of course, mols and parts are to be expressed in comparable terms. For example, 5 millimols and 100 parts can be expressed as 5 milligram-mols and 100 gram parts or as 5 millipound-mols and 100 pound parts.

A suitable catalyst should be used when introducing curing radicals into the SPSA component. For example, when using a silicon hydride to introduce curing radicals it is desirable to use a platinum group metal catalyst such as platinum or rhodium and its compounds and complexes to accelerate the hydrosilylation reaction. When using a silazane to introduce curing radicals it is desirable to use a strong acid catalyst such as trifluoroacetic acid. When using an alkoxysilane to introduce curing radicals it is desirable to use a titanate catalyst such as tetrabutyl titanate. In addition to a SPSA component bearing silicon-bonded curing radicals the compositions of this invention preferably further comprise an effective amount of a catalyst component to accelerate the reaction of the curing radicals with moisture to form siloxane bonds.

Catalysts for accelerating the reaction of the OR' radicals with moisture to form siloxane bonds are well known in the silicone elastomer art and need no detailed delineation herein. Briefly, said catalysts include, but are not limited to, metal salts of monocarboxylic acids, such as stannous octoate, dibutyltin dilaurate and dibutyltin diacetate; titanium esters, such as tetrabutyl titanate, tetraethylhexyl titanate and tetraphenyltitanate; siloxytitanates, such as tetrakis(trimethylsiloxy)titanium and bis(trimethylsiloxy)-bis(isopropoxy)titanium; and betadicarbonyltitanium compounds, such as bis-(acetylacetonyl)diisopropyl titanate; amines, such as hexylamine; and their acetate and quat salts.

Preferred catalyst are bis(acetylacetonyl)diisopropyl titanate and certain orthotitanates, such as tetrabutyl titanate, and their partial hydrolyzates. The amount of titanium-containing catalysts typically ranges from 0.1 to 2%, based on the weight of the SPSA component.

The compositions of this invention can be prepared by introducing curing radicals of the formula noted above into a SPSA, preferably dissolved in a solvent, and, if desired, thereafter admixing a suitable amount of the catalyst component. The solvent component can be any liquid that will dissolve the SPSA and the curing radical-containing SPSA component without adversely reacting therewith in the absence of moisture. Examples of suitable solvents include aromatic hydrocarbons, such as benzene, toluene and xylene; aliphatic hydrocarbons, such as hexane, heptane and cyclohexane; halogenated hydrocarbons such as chlorocarbons; oxygenated solvents such as esters, ketones and lower alcohols; and volatile siloxanes such as hexamethyldisiloxane and cyclopolydimethylsiloxanes.

The compositions of this invention typically, but not necessarily, further comprise an appropriate quantity of a solvent to provide for a lower viscosity, and hence an easier application of, the SPSA composition to various substrates. Concrete examples of this component are the same as those delineated above for use during the preparation of the SPSA component and mixtures thereof. The amount of solvent is not critical; however, only a sufficient amount to facilitate the preparation, handling and applying of the composition is recommended. The solvent, when used, is preferably a non-reactive hydrocarbon solvent or siloxane solvent and is preferably used in an amount sufficient to provide a viscosity of from 10,000 to 100,000 centipoise at 25 C for the composition. It has been found convenient, but not necessary, to prepare the SPSA component in a solvent that can be allowed to remain in the final composition. Concrete examples of this component are the same as those delineated above for use during the preparation of the SPSA component and mixtures thereof. The solvent, when used, is preferably a non-reactive hydrocarbon solvent or siloxane solvent. It has been found convenient, but not necessary, to prepare the SPSA component in a solvent that can be allowed to remain in the final composition as a viscosity adjusting solvent.

The compositions of this invention can be used in all of the applications to which the SPSA compositions of the art are directed since they possess adhesive properties in their uncured state, one or more of which will improve upon exposure to ambient moisture. Additionally, the compositions of this invention can be used in all of the applications to which the permanent adhesive compositions of the art are directed since certain embodiments thereof will cure to the permanent adhesive state upon exposure to ambient moisture. It is expected that the compositions of this invention will satisfy other adhesive needs in view of their moisture-activated curing capability.

Typically, the use of the compositions of this invention comprises applying a composition of this invention to a substrate; removing substantially all of the solvent from the applied composition to provide an adhesive-bearing substrate; and adhering the adhesive-bearing substrate to a surface. Optionally, one can expose the adhesive on the adhered substrate to moisture to improve one or more adhesive properties selected from tack, peel adhesion, tensile adhesion, adhesive failure mode, yield modulus, modulus at cohesive failure, etc.

Preferably, a composition of this invention is applied to the substrate and devolatized before any substantial gelling of the composition occurs. For compositions of this invention comprising a catalyst component it is recommended that the composition be prepared within a day or two of being applied to the substrate and devolatized. Thereafter it is preferred to apply the adhesive-bearing substrate to the surface before the adhesive has experienced a complete loss of tack. It is recommended that the adhesive-bearing substrate be applied to the surface within a few days to a few weeks after being prepared. If there is any delay in applying the adhesive-bearing substrate to the surface it is recommended to maintain the adhesive under substantially anhydrous conditions.

The SPSA component bearing silicon-bonded curing radicals having the formula $R_b(OR')_{3-b}SiZ—$ must bear an average of at least one, preferably at least two, and most preferably 3 to 5, silicon-bonded curing radical per molecule of SPSA. Any remaining silanol radicals in the SPSA are preferably, but not necessarily, capped with non-reactive silyl groups, such as $R_3SiO_{\frac{1}{2}}$ groups. Silanol-capping to provide said non-reactive silyl groups can be done with a silanol-capping compound having the formula $R_3SiY$ wherein Y has the same meaning as noted above. Examples of silanol-capping compounds which provide non-reactive silyl groups and an ammonia by-product include silazanes, such as $R_3SiNH_2$, and disilazanes, such as $R_3SiNHSiR_3$.

The objects of the present invention are most conveniently met when the SPSA component bearing silicon-bonded curing radicals having the formula $R_b(OR')_{3-b}SiZ—$ is prepared by capping a silanol-radical containing SPSA of the art with an appropriate amount of an alkoxysilylalkylene radical-substituted silazane or disilazane and an appropriate amount of a trialkylsilyl-substituted silazane or disilazane to provide a silanol-free silicone pressure sensitive adhesive.

It is within the scope and spirit of the present invention to prepare the SPSA component bearing silicon-bonded curing radicals having the formula $R_b(OR')_{3-b}SiZ—$ by an alternative silanol-capping process, using any of the silanol-capping compounds delineated above, by capping the organopolysiloxane resin portion or the polydiorganosiloxane fluid or gum portion before preparing the SPSA therefrom. In this manner the SPSA component bearing silicon-bonded curing radicals having the formula $R_b(OR')_{3-b}SiZ—$ is obtained when the SPSA is prepared, by way of well-known methods, except using one or more components comprising one or more, preferably two or more and most preferably 3 to 5, curing radicals.

In addition to a SPSA component bearing silicon-bonded curing radicals the compositions of this invention preferably further comprise an effective amount of a catalyst component to accelerate the reaction of the hydrolyzable radicals with moisture to form siloxane bonds.

The reactivity of silicon-bonded hydrolyzable radicals in the radicals having the formula $R_b(OR')_{3-b}SiZ—$ is expected to vary with the identities of R, R' and Z and the value of the subscript b. For example, it is expected that the hydrolytic reactivity of, for example, an alkoxy radical will vary with the size of the alkyl portion thereof, as well as the size of R if b=1.

Catalysts for accelerating the reaction of the OR' radicals with moisture to form siloxane bonds are well known in the silicone elastomer art and need no detailed delineation herein. Briefly, said catalysts include, but are not limited to, metal salts of monocarboxylic acids, such as stannous octoate, dibutyltin dilaurate and dibutyltin diacetate; titanium esters, such as tetrabutyl titanate, tetraethylhexyl titanate and tetraphenyltitanate; siloxytitanates, such as tetrakis(trimethylsiloxy)titanium and bis(trimethylsiloxy)-bis(isopropoxy)titanium; and betadicarbonyltitanium compounds, such as bis-(acetylacetonyl)diisopropyl titanate; amines, such as hexylamine; and their acetate and quat salts.

Preferred catalyst are bis(acetylacetonyl)diisopropyl titanate, stannous carboxylates and certain orthotitanates and their partial hydrolyzates. The amount of titanium-containing catalysts typically ranges from 0.1 to 2%, based on the weight of siloxane. Further description of the silicone pressure sensitive adhesive which is curable to a permanent adhesive upon exposure to moisture is found in U.S. Patent Applications titled "SOLU- TION-STABLE, MOISTURE-CURABLE SILICONE PRESSURE SENSITIVE ADHESIVES" and "STABLE, MOISTURE-CURABLE SILICONE PRESSURE SENSITIVE ADHESIVES", filed on even date herewith and assigned to the assignee of this application. The disclosures of said co-pending and co-assigned applications are incorporated herein by reference to fully delineate these SPSA compositions and how to prepare them.

A preferred SPSA is a composition comprising (A) a silanol-free silicone pressure sensitive adhesive component bearing curing radicals having the formula $R_b(OR')_{3-b}SiZ—$ and capping radicals having the formula $R_3SiO—$ wherein Z denotes a divalent radical linking the silicon atom of the curing radical to a silicon atom of the silicone pressure sensitive adhesive component, R denotes a monovalent hydrocarbon radical, R' denotes an alkyl or alkoxyalkyl radical, and the subscript b has a value of 0 or 1; all other silicon-bonded radicals of the silicone pressure sensitive adhesive component being selected from the group consisting of divalent oxygen atoms linking silicon atoms, hydrogen atoms and monovalent hydrocarbon radicals; (B) an effective amount of a catalyst component to accelerate the reaction of the curing radicals with moisture to form siloxane bonds; and (C) an effective amount a silicon compound bearing a plurality of silicon-bonded alkoxy radicals to improve the shelf life of the composition.

In addition to a SPSA component bearing silicon-bonded curing radicals and an effective amount of a catalyst component (B) to accelerate the reaction of the curing radicals with moisture to form siloxane bonds the compositions of this preferred SPSA further comprise (C) an effective amount a silicon compound bearing a plurality of silicon-bonded alkoxy radicals to improve the shelf life of the composition.

Component (C) in the compositions of this preferred composition can be any compound bearing two or more, preferably three or more, silicon-bonded alkoxy radicals. Any other silicon-bonded radicals in component (C) are to be selected from the group consisting of divalent oxygen atoms linking silicon atoms, divalent hydrocarbon atoms linking silicon atoms, hydrogen atoms and monovalent hydrocarbon radicals. The component (C) can be a silane or a partial hydrolyzates and/or condensates thereof. Examples of suitable silanes include di-, tri- and tetra-alkoxy silanes wherein the alkoxy radicals are, for example, methoxy, ethoxy, n-propoxy, i-propoxy and butoxy, each used singularly or in mixtures, and the other silicon-bonded radicals, if present, include hydrogen; monovalent hydrocarbon, such as alkyl, such as methyl, ethyl, propyl; aryl, such as phenyl and benzyl; and olefinic, such as vinyl and allyl; and polyvalent hydrocarbon, such as ethylene and phenylene. Included herein are orthosilicates, such as ethyl orthosilicate and n-propyl orthosilicate; alkyltrialkoxy silanes, such as methyltrimethoxy silane; alkylene-bis-trialkoxysilanes, such as bis-trimethoxysilylethane; and polysilicates, such as ethyl polysilicate.

These preferred compositions can be prepared by introducing curing and capping radicals of the formulae noted above into a SPSA composition, preferably in solution, to form the SPSA component and thereafter admixing a suitable amount of the silicon component (C) bearing a plurality of silicon-bonded alkoxy radicals and a suitable amount of the catalyst component (B).

The solvent component can be any liquid that will dissolve the SPSA and the curing radical-containing component without adversely reacting therewith in the absence of mositure. Examples of suitable solvents include aromatic hydrocarbons, such as benzene, toluene and xylene; aliphatic hydrocarbons, such as hexane, heptane and cyclohexane; halogenated hydrocarbons such as chlorocarbons; oxygenated solvents such as esters, ketones and lower alcohols; and volatile siloxanes such as hexamethyldisiloxane and cyclopolydimethylsiloxanes.

The silicone pressure sensitive adhesive described above can be applied to the tape substrate by any suitable method. The composition can be sprayed, painted, or roller coated onto the surface of the substrate. The solvent is then removed by air drying or heating to a suitable temperature to give a coating of the adhesive on the substrate surface. If the opposite side of the substrate is to be coated, a release film can be placed over the adhesive, the assembly turned over and adhesive applied to the second side in a similar manner.

A second method of making the pressure sensitive tape is through the use of a release liner. The silicone pressure sensitive adhesive composition is applied to a release liner by spraying, roller coating, drawdown bar, or other suitable means. The coating is then dried to give a film of pressure sensitive adhesive on the release liner. This construction is known as a transfer tape. This transfer tape is then used to make the pressure sensitive tape by applying the exposed adhesive to the surface of the tape substrate, giving an adhesive attached to the tape substrate and covered with a release film.

A preferred release liner comprises a plastic film, such as polyester or polyethylene coated on one or both sides with a silicone release agent. A preferred silicon release agent is one in which a fluorosilicone polymer such as is described in U.S. Pat. No. 4,736,048, issued Apr. 5, 1988, which is hereby incorporated by reference to show coating compositions, is used. Further description of release liner and moisture-curable silicone pressure sensitive adhesive is found in co-pending application for U.S. Patent, titled, "LAMINATE ARTICLE COMPRISING MOISTURE-CURABLE SILICONE PRESSURE SENSITIVE ADHESIVE AND RELEASE LINER", filed on even date herewith and assigned to the assignee of this application. The disclosure of said co-pending and co-assigned application is incorporated herein by reference to fully delineate the transfer tape.

A preferred method of manufacturing a silicone elastomeric structural glazing tape comprises (A) applying to a tape substrate, which is a silicone elastomer having a rectangular shape in which two opposing bonding surfaces are flat or convex with the maximum height of the convex surface less than 1.2 percent of the width of the convex surface, and in which two opposing non-bonding surfaces are flat or concave, a transfer tape comprising a release sheet film having a softening point of greater than 50° C. coated with a film of moisture-curable silicone pressure sensitive adhesive, the film of moisture-curable silicone pressure sensitive adhesive being in contact with the bonding surface or surfaces of the tape substrate, (B) peeling off the release sheet film to expose the moisture-curable silicone pressure sensitive adhesive, then (C) covering the moisture-curable silicone pressure sensitive adhesive with a releasable film of polyethylene, then (D) packaging the tape, comprising a releasable film of polyethylene covering moisture-curable silicone pressure sensitive adhesive adhered to the bonding surfaces of the tape substrate, in a moisture-impermeable container.

The preferred tape substrate is a silicone rubber extrusion having a Shore A durometer of from about 30 to 70. The tape has a rectangular shape in which the two opposing bonding surfaces are flat or convex, with the maximum height of the convex surface less than 1.2 percent of the width of the convex surface. This shape has been found to provide the best air-free contact between the silicone pressure sensitive adhesive on the surface and the surface to be bonded to. The tape substrate is generally on the order of ½ inch in width with a thickness of ¼ inch to ½ inch, but can be made any desired size.

The preferred method of applying the silicone pressure sensitive adhesive to the bonding surface or surfaces of the tape substrate is through the use of the transfer tape discussed above wherein a releasable release sheet film is coated with the silicone pressure sensitive adhesive composition described above. This transfer tape is then adhered to the tape substrate by applying an exposed surface of the silicone pressure sensitive adhesive to the cleaned bonding surface of the tape substrate. This can be done by hand methods or through the use of machinery as preferred. A description of both methods is found in the examples.

After the silicone pressure sensitive adhesive is applied to both bonding surfaces of the tape substrate, it is preferred to remove the polyester release films from both sides of the construction and replace them with one releasable film of polyethylene. This is done by removing one of the original polyester release films from the construction and replacing it with a polyethylene release film which has been coated on both sides with a release coating, preferably the fluorosilicone release coating discussed above. As the polyethylene film is easily stretched, the tape substrate with the adhesive on both sides and the releasable polyethylene film on one side of the adhesive may be formed into a roll by winding the construction around a circular core and upon the preceding layer of itself. The polyester release film on the second adhesive layer is removed as this is done so that the second adhesive layer is placed against the second release coated surface of the polyethylene film which had been previously applied to the first adhesive surface. This process results in a roll of tape substrate having a layer of silicone pressure sensitive adhesive on both bonding surfaces wound in layers with a releasable film of polyethylene between the layers of adhesive coated tape substrate. It is preferred that this entire process be carried out in an atmosphere with a minimum of moisture present since the preferred adhesive cures upon exposure to moisture.

The roll of tape is stored for use when desired by packaging the roll of tape in a moisture-impermeable container. The preferred container is an aluminum foil plastic laminate pouch which can be heat sealed. The roll of pressure sensitive adhesive tape is placed in the pouch, with a desiccant such as silica gel present if desired, the air in the pouch is removed, and the pouch is heated sealed. The silicone pressure sensitive adhesive is thus prevented from curing.

To use the tape, the roll is removed from the container and the tape is unrolled. The tape will have one adhesive surface exposed and the other adhesive surface covered with the releasable polyethylene film. The exposed adhesive surface is applied to the surface to be adhered to and the tape forced into intimate contact with the underlaying surface. The releasable polyethylene film on the upper adhesive surface is then removed and the second substrate to be adhered to is applied over the exposed adhesive and forced into intimate contact with the adhesive. Because the adhesive is a pressure sensitive adhesive, it will hold the two substrates together. Now that the adhesive on the tape is exposed to moisture, the adhesive will gradually cure to permanently bond the two substrates together.

The following examples are included for illustrative purposes only and should not be construed as limiting the invention which is properly set forth in the appended claims. Parts are parts by weight.

EXAMPLE 1

A silicone pressure sensitive adhesive composition was prepared by mixing 40 parts of solid, benzene soluble resin copolymer consisting essentially of $R_3SiO_{\frac{1}{2}}$ units and $SiO_{4/2}$ units where R is a monovalent hydrocarbon radical containing no more than 6 carbon atoms, there being from 0.6 to 0.9 inclusive $R_3SiO_{\frac{1}{2}}$ units for every $SiO_{4/2}$ unit, at least 95 percent of all radicals in the copolymer being methyl and the total number of R radicals in the copolymer that have olefinic unsaturation being no more than 0.5 percent, with 29 parts of xylene. This was then blended with 23 parts of hydroxyl endblocked polydimethylsiloxane gum having a Williams Plasticity of about 63 and the mixture was heated to 140° C. with mixing. After cooling to 70° C. 4.4 parts of a reaction mixture prepared by adding tetramethyldisilazane to a mixture of vinyltrimethoxysilane and chloroplatinic acid complexed with divinyltetramethyldisiloxane to give about 15.6% non-silazane materials comprising 5% starting materials and 10.6% $[(Me)_3SiCH_2]_2$; 79.8% silazane materials comprising 10.6% $[(MeO)_3SiC_2H_4SiMe_2NHSiMe_2CH_2]_2$, 69.2% $[(MeO)_3SiC_2H_4SiMe_2]_2NH$ and 4.6% unidentified products was added with mixing, then 0.2 parts of trifluoroacetic acid catalyst was added. The mixture was heated to 100° C. and reacted, then cooled to 70° C. and 0.5 part of hexamethyldisilazane was added, the mixture was heated to 100° C. to react and the mixture was cooled to room temperature to give the silicone pressure sensitive adhesive composition.

Then 29.71 g of the above adhesive was weighed into a clean two ounce vial. Next 0.31 g of tetrabutyltitanate (TYZOR TBT) was hand mixed with a microspatula until blended. The vial was centrifuged for two minutes to remove trapped air bubbles.

A silicone rubber tape substrate of 70 durometer, which had been extruded into a rectangle of ¼ inch by ½ inch with a number of small holes in the interior, was cut into lengths of about 13 inches. The substrate was then dunked into a bath containing a 50/50 by weight mixture of toluene and iso-propyl alcohol and then rinsed with clean toluene. The substrate was then scrubbed with a piece of cheese cloth which was soaked with clean toluene to remove any dirt or grime. The substrate stock was then allowed to air dry for 3 to 4 hours.

Two pieces of the above cleaned 70 durometer, ¼ inch by ½ inch substrate, approximately 13 inches long were placed into a coating fixture. Shim stock was placed on the edges of the coater to provide a 10 mil gap for a wet coat of adhesive. The SPSA described above was then carefully poured, to prevent trapping air bubbles, onto the surface of the substrate. An aluminum panel 3 inches wide and 5 inches long was used to draw a 10 mil wet coat of the SPSA evenly over the core surface. The coated substrates were then removed from the fixture and placed on an oven tray. The tray was then placed into an air circulating oven, controlled at 70 C. (158 F.). A five minute oven dry time was used to remove the xylene solvent from the coating. The coated cores were then removed from the oven and allowed to cool approximately 10 min. at laboratory conditions. A release liner of polyester film approx. 3 mil thick and coated on one side with a dimethyl, methylperfluorobutylethyl, methylvinylsiloxane copolymer (Dow Corning (R) Q2-7785 Release Coating) was placed over the adhesive film surface. The release liner was then trimmed to the width of the substrate with a razor blade. This gave a pressure sensitive adhesive tape having adhesive on one side, covered with a release liner.

This pressure sensitive adhesive tape was then placed back into the coating fixture with the covered side down. A piece of 6 mil shim stock was placed on top of the other shims to compensate for the release liner and the adhesive film on the other side of the core. This provided a 10 mil gap for the second wet coat of SPSA. The coating procedure with the oven dry cycle was repeated. After cooling the second time, a second piece of release liner was placed over the adhesive film and cut to size as described above. This gave a pressure sensitive adhesive tape having two opposing surfaces coated with SPSA which was protected by release liners.

Tensile adhesion joints were prepared, using the following procedure, to test the ability of the above pressure sensitive adhesive tape to hold two surfaces together.

Each 13 inch piece of tape was cut into two inch lengths, six per tape. Cleaned glass coupons (1 inch wide by 3 inches long and ¼ inch thick) were used to prepare the samples. The release liner was removed from one side of the tape and the glass coupon was pressed on to the edge of the tape and rolled across the adhesive film surface. This technique was used to minimize trapping air between the adhesive film surface and the glass surface. Once in place the glass panel was turned over and the second piece of release liner was removed from the tape. Another piece of glass was then placed at the edge of the tape and rolled onto the surface of the adhesive film. A sandwich was thus formed with the double sided tape adhered to two pieces of glass. This sample preparation was repeated until a total of 12 tensile adhesion joints were built. Each sample had one square inch of tape surface area attached to the glass.

The test samples were then evaluated for percent glass contact and when the values were recorded, the test joints were submitted for testing. The tensile and elongation values were measured for each sample. Three test joints were measured at the following test times, 0, 3, 7, and 14 days. Samples were aged at ambient lab conditions (25 C. and 50% relative humidity). These tests were a modification of ASTM 1135-90 Test Method for Determining Tensile Adhesion Properties of Structural Sealants. The results obtained were as follows.

TABLE I

| Sample | Test Time Days | Tensile Adhesion % Glass Side A | Contact Side B | Tensile Strength psi | Elongation percent |
|---|---|---|---|---|---|
| 1 | 0 | 90 | 90 | 59.5 | 30 |
| 2 | 0 | 95 | 97 | 62 | 30 |
| 3 | 0 | 97 | 95 | 61 | 35 |
| average | 0 | | | 60.8 | 31.6 |
| 4 | 3 | 93 | 93 | 146 | 65 |
| 5 | 3 | 98 | 100 | 163 | 80 |
| 6 | 3 | 98 | 98 | 139 | 65 |
| average | 3 | | | 149.4 | 70 |
| 7 | 7 | 97 | 92 | 132.5 | 60 |
| 8 | 7 | 95 | 95 | 140.5 | 60 |
| 9 | 7 | 95 | 98 | 154 | 70 |
| average | 7 | | | 142.3 | 63.3 |
| 10 | 14 | 98 | 98 | 162.3 | 70 |
| 11 | 14 | 97 | 98 | 136 | 60 |
| 12 | 14 | 100 | 98 | 132 | 55 |
| average | 14 | | | 143.4 | 61.6 |

EXAMPLE 2

A pressure sensitive tape was prepared in the laboratory through the use of a transfer film.

Silicone pressure sensitive adhesive composition was prepared in the same manner as in Example 1.

A sheet of 3 mil thick polyester backing coated with the fluorosilicone release described in Example 1 (12 inches wide by 14 inches long) was placed and taped to a piece of white freezer wrap paper with the release coated side up. A 3" multiple film applicator (Pacific Scientific Cat. No. AR-5340), commonly refered to as a bird box, was placed near one edge of the release liner, with the 10 mil gap on the liner. The SPSA was then carefully poured into the bird box (approx. 7 to 10 grams) to avoid air bubbles. The bird box was then pull down the length of the release liner leaving a 10 mil wet coat of SPSA on the release liner surface. The film of adhesive was about three inches wide. The casting procedure was repeated until three films were made on the sheet of release liner. The liner was then removed from the kraft paper and placed onto an oven tray. The liner was held in place by four clamps. The tray was then placed into an air circulating oven controlled at 70 C. (158 F.) and oven dried for 5 minutes. The oven tray was removed and placed on a lab bench to cool (approx. 10 min.). The three films were then separated by cutting with a razor blade.

Strips of tape substrate were cleaned in the manner described in Example 1. A piece of cleaned tape substrate was placed on a sheet of clean white kraft paper, polyethylene side up. A sheet of the above described transfer film (3 inches wide) was turned adhesive film side down and applied to the surface of the tape substrate; starting from left to right. The film was positioned using the index finger to apply pressure to remove any trapped air bubbles. Once the film was completely positioned down the length of the substrate, the excess film was trimmed away. A ten pound steel roller was then moved over the release liner, to assure transfer of the adhesive film from the release liner to silicone rubber tape substrate. This process was repeated on the opposite side of the substrate, yielding a piece of double sided pressure sensitive adhesive tape. Two 13 inch pieces of tape were prepared by this technique.

Tensile adhesion joints were then prepared in the same manner as described in Example 1. The results of the tests were as follows.

TABLE II

| Sample | Test Time Days | % Glass Side A | Contact Side B | Tensile Strength psi | Elongation percent |
|---|---|---|---|---|---|
| 1 | 0 | 93 | 99 | 102.8 | 40 |
| 2 | 0 | 93 | 98 | 101.3 | 40 |
| 3 | 0 | 95 | 96 | 102.4 | 45 |
| average | 0 | | | 102.2 | 41.7 |
| 4 | 3 | 96 | 95 | 136 | 60 |
| 5 | 3 | 97 | 95 | 134 | 60 |
| 6 | 3 | 93 | 97 | 129 | 55 |
| average | 3 | | | 133 | 58.3 |
| 7 | 7 | 98 | 92 | 138 | 70 |
| 8 | 7 | 92 | 95 | 114.3 | 55 |
| 9 | 7 | 90 | 100 | 86 | 35 |
| average | 7 | | | 112.8 | 53.3 |
| 10 | 14 | 80 | 98 | 82.8 | 40 |
| 11 | 14 | 60 | 98 | 68.5 | 35 |
| 12 | 14 | 92 | 98 | 115 | 65 |
| average | 14 | | | 88.8 | 46.7 |

EXAMPLE 3

The film transfer technique of Example 2, using a different silicone pressure sensitive adhesive composition, was repeated.

The silicone pressure sensitive adhesive composition was 60.03 g of the composition described in Example 1, 2.19 g of normal orthopropyl silicate, 0.12 of titanium-di-isopropoxy-di-ethylacetoacetate, and 6.68 g of xylene. The ingredients were weighed out into a 2 oz. wide mouth squat jar. These were then hand mixed with a 3 inch stainless steel spatula. After mixing the jar was sealed and placed into the centrifuge and deaired for about 2 minutes at ¾ speed. The 6 grams of xylene was added to the formulation to adjust the viscosity of the composition to approximately 60,000 cp., which was the preferred working viscosity for film production.

The adhesive was used to prepare transfer films as described in Example 2, except that the wet film thickness was 0.020 inches and five sample films were prepared.

The tape substrate used was a silicone rubber extrusion having a 70 durometer in the shape of a rectangle having a width of ½ inch and a height of ⅜ inch. There were two holes through the extrusion of a rectangular shape with a width of about ⅛ inch and a height of about ¼ inch. The ½ inch surfaces which subsequently had adhesive applied to them were flat, while the ⅜ inch surfaces were concave. The tape substrate was cleaned as described in Example 1.

The pressure sensitive adhesive tape was prepared from the tape substrate and transfer film described above in the manner described in Example 1. Four pieces of tape 13 inches long were prepared. From these, 24 tensile adhesion samples were prepared and tested as described above. The test results are shown in Table III.

TABLE III

| Sample | Test Time Days | % Glass Side A | Contact Side B | Tensile Strength psi | Elongation percent |
|---|---|---|---|---|---|
| 1 | 0 | 90 | 90 | 97 | 40 |
| 2 | 0 | 97 | 98 | 104.5 | 35 |
| 3 | 0 | 99 | 97 | 107 | 35 |
| average | 0 | | | 102.8 | 36.7 |
| 4 | 3 | 90 | 100 | 147.5 | 60 |
| 5 | 3 | 95 | 97 | 150 | 60 |
| 6 | 3 | 95 | 99 | 148 | 65 |
| average | 3 | | | 148.5 | 61.7 |
| 7 | 14 | 95 | 97 | 168 | 65 |
| 8 | 14 | 92 | 97 | 170 | 65 |
| 9 | 14 | 96 | 98 | 172 | 75 |
| average | 14 | | | 170 | 68.3 |
| 10 | 30 | 96 | 98 | 192.5 | 80 |
| 11 | 30 | 97 | 98 | 200 | 85 |
| 12 | 30 | 96 | 97 | 197.5 | 95 |
| average | 30 | | | 196.7 | 86.7 |
| 13 | 90 | 97 | 97 | 255 | 115 |
| 14 | 90 | 96 | 97 | 256 | 115 |
| 15 | 90 | 97 | 98 | 255 | 120 |
| average | 90 | | | 255.4 | 116.6 |
| 16 | 180 | 98 | 98 | 291.5 | 155 |
| 17 | 180 | 96 | 96 | 285.5 | 135 |
| 18 | 180 | 99 | 98 | 280.5 | 135 |
| average | 180 | | | 285.83 | 141.6 |
| 19 | 270 | 98 | 97 | 301 | 145 |
| 20 | 270 | 99 | 98 | 301 | 135 |
| 21 | 270 | 96 | 99 | 294 | 140 |
| average | 270 | | | 298.7 | 140 |
| 22 | 365 | 98 | 100 | 303 | 145 |
| 23 | 365 | 96 | 99 | 302 | 145 |
| 24 | 365 | 97 | 99 | 307 | 145 |
| average | | | | 304 | 145 |

EXAMPLE 4

A silicone pressure sensitive adhesive was prepared by mixing a solution of 27 parts of xylene, 38 parts of a xylene solution containing 70 percent of a soluble organopolysiloxane consisting of $(CH_3)_3SiO_{\frac{1}{2}}$ units and $SiO_{4/2}$ units in a mol ratio of 0.8/1 and having a hydroxyl content of 3.45 percent and $M_n$ of 1,963, $M_w/M_n$ of 2.57 as measured by gel-permeation chromatography using Varian TSK 4000+2500 columns at 35° C., a chloroform mobile phase (flow rate) at 1 microL/m and an IR detector set at 8.5 microns to detect $SiO_2$, and 23 parts of a hydroxyl-terminated polydimethylsiloxane gum having a plasticity number of 137–152, as measured by ASTM 926-67, and a viscosity of at least 10,000,000 centipoise at 25° C., and heating the mixture for 5 hours at 140° C. Then the mixture was cooled to 70° C. and 3.8 parts of a reaction mixture of 15.6 percent non-silazane materials comprising 5 percent starting materials and 10.6 percent $[(MeO)_3SiCH_2]_2$; 79.8 percent silazane materials comprising 10.6 percent $[(MeO)_3SiC_2H_4SiMe_2NHSiMe_2CH_2]_2$, 69.2 percent $[(MeO)_3SiC_2H_4SiMe_2]_2NH$; and 4.6 percent unidentified products, prepared by adding tetramethyldisilazane to a mixture of vinyltrimethoxysilane and chloroplatinic acid complexed with divinyltetramethyldisiloxane was added with 0.2 parts of trifluoroacetic acid and heated at 100° C. for 1 hour. The reaction mixture was cooled to 70° C. and 3.4 parts of hexamethyldisilazane was added and the mixture was again heated to 100° C. for one hour. After cooling to room temperature 3.5 parts of normal-propyltetrasilicate was added and the solution was filtered. The resulting silicone pressure sensitive adhesive base was a 40 percent solids solution.

Under anhydrous conditions, 4994 g of the above base was thoroughly mixed with 10.02 g of titanium diisopropoxy-bis(ethylacetoacetate). After 24 hours storage to allow removal of entrapped air, the catalyzed mixture was used in a pilot plant coating machine to prepare a transfer film. The catalyzed silicone pressure sensitive adhesive was applied to a 12 inch wide roll of release liner to a wet thickness of about 0.035 inch, then the solvent was removed by heating for about 5 minutes at 70° C. The release liner was a 2 mil thick polyester film that was coated, using a #8 Meyer rod, with a fluorosilicone adhesive-release coating composition consisting of 10 parts of a vinyldimethylsiloxane-endblocked fluorosilicone polymer having about 1500 silicon atoms per molecule, including 30 mol percent $C_4F_9C_2H_2(CH_3)SiO_2$ units, 15 mol percent $CH_2=CHMeSiO_{2/2}$ units, and the balance dimethylsiloxane units; 89.7 parts of trichlorotrifluoroethane; 0.3 part of a complex of divinyltetramethyldisiloxane and $H_2PtCl_6$; a cure-delaying amount of a catalyst inhibitor and a sufficient amount of $Me_3SiO(MeC_4F_9C_2H_2)_{12}$-$(MeHSiO)_{28}SiMe_3$ to provide 4 silicon-bonded hydrogen atoms for each silicon-bonded vinyl radical in the composition. The coating was heated for 24 seconds at 150° C. to provide a coating weight of about 0.6 pounds per ream. A second release liner was placed over the adhesive surface and the resulting laminate was rolled for storage under anhydrous conditions.

Strips of tape substrate of 30 durometer silicone rubber extrusion ½ inch wide and ¼ inch thick in 13 inch lengths were cleaned by scrubbing with a toluene soaked piece of cheese cloth and then air drying for 2 to 3 hours. The above described transfer film was then used to apply adhesive to the opposing ½ inch surfaces of the tape substrate by first cutting the transfer film into 9/16 inch wide strips, 13 inches long. The second release liner was removed from the surface of the adhesive for about two inches to expose the adhesive film surface. This tab of adhesive film surface was then attached to the end of the piece of cleaned tape substrate, using finger pressure to secure the starting point of the transfer film. The bottom piece of release liner was slowly pulled away from the transfer film while the adhesive film was being positioned and secured to the tape substrate with finger pressure. The procedure was continued until the entire length of transfer film was adhered to the tape substrate, the adhesive film being covered on the outside by the first release liner. Then a ten pound roller was applied to the construction to firmly adhere the adhesive layer to the tape substrate. The procedure was repeated to apply a second layer of transfer film to the opposite side of the tape substrate to give a double sided adhesive tape.

The double sided adhesive tape was then cut into 2 inch lengths and the pieces used to prepare tensile joints in the manner described in Example 1. These were tested in the manner described in Example 1 with the results as shown in Table IV.

TABLE IV

| Sample | Test Time Days | Tensile Adhesion % Glass Side A | Contact Side B | Tensile Strength psi | Elongation percent |
|---|---|---|---|---|---|
| 1 | 0 | 96 | 97 | 68 | 60 |
| 2 | 0 | 97 | 96 | 69 | 60 |
| 3 | 0 | 96 | 96 | 69 | 60 |
| average | 0 | | | 68.3 | 60 |
| 4 | 5 | 97 | 98 | 102.3 | 130 |
| 5 | 5 | 95 | 96 | 98.8 | 110 |
| 6 | 5 | 97 | 96 | 102 | 125 |
| average | 5 | | | 101 | 121.7 |
| 7 | 14 | 95 | 95 | 136 | 180 |
| 8 | 14 | 97 | 98 | 140.6 | 185 |
| 9 | 14 | 98 | 96 | 124 | 155 |

TABLE IV-continued

| Sample | Test Time Days | Tensile Adhesion % Glass Side A | Contact Side B | Tensile Strength psi | Elongation percent |
|---|---|---|---|---|---|
| average | 14 | | | 133.5 | 173.3 |
| 10 | 30 | 98 | 97 | 143.7 | 180 |
| 11 | 30 | 97 | 95 | 139.5 | 170 |
| 12 | 30 | 95 | 96 | 178.5 | 235 |
| average | 30 | | | 153.9 | 195 |

EXAMPLE 5

The silicone pressure sensitive adhesive of Example 4 was used to make a roll of transfer film in the same manner as described in Example 4. The roll of transfer film was then slit into rolls of ½ inch width which were stored in the absence of moisture.

A tape substrate was prepared by extruding and curing a silicone rubber which had a durometer of about 40. The tape substrate was ½ inch in width and ¼ inch in thickness with flat surfaces. The surfaces of the extrusion were cleaned with toluene impregnated cheese cloth as the extrusion was removed from the storage reel and allowed to air dry until used.

A 6 foot long strip of the tape substrate was placed against a straightedge on a table and the transfer film was applied to the upper ½ inch surface of the tape substrate in the same manner as described in Example 4. The opposite ½ inch surface was then treated in the same manner to give a 6 foot long strip of double sided pressure sensitive adhesive tape. Samples were prepared in the same manner which were 12 feet and 18 feet long.

These sample strips of double sided pressure sensitive adhesive tape were then formed into rolls and vacuum packaged for storage by the following procedure. The polyester release liner on one side of the tape was carefully removed and replaced with a polyethylene release liner that was ½ inch wide which had been coated on both sides with the fluorosilicone release coating described above in Example 4. This polyethylene release liner was seated by rolling a 10 pound roller over the tape to secure it to the adhesive.

The adhesive tape was then formed into a roll by winding around a 3 inch diameter plastic spool with ½ inch width. As the adhesive tape was wound around the spool, the second polyester release film was removed from the adhesive surface on the second side of the double sided tape. This surface then was wrapped onto the top side of the polyethylene release liner on the first adhesive surface of the adhesive tape. The roll was held in place by wrapping a length of polyester tape around the radius. A small package of silica gel desiccant was placed into the center of the roll of tape and the entire roll was wrapped in a sheet of polyester release liner with the release coating against the edge of the tape roll. The covered tape roll was then placed into an aluminum foil laminated plastic bag and the air within the bag was evacuated and the bag heat sealed to give a package which was dry and moisture impermeable in order to store the roll of pressure sensitive adhesive tape which was made with a pressure sensitive adhesive which was further curable upon exposure to moisture.

After storage for 2 days, the bag of adhesive tape was opened and the roll of tape was used to make tensile adhesive test samples in the manner described above for QA data purposes. These samples were tested in the manner described above with the results shown in Table V.

TABLE V

| Sample | Test Time Days | Tensile Adhesion % Glass Side A | Contact Side B | Tensile Strength psi | Elongation percent |
|---|---|---|---|---|---|
| 1 | 0 | 98 | 98 | 72 | 30 |
| 2 | 0 | 98 | 98 | 72.5 | 40 |
| 3 | 0 | 98 | 98 | 73.8 | 40 |
| average | 0 | | | 72.8 | 36.7 |
| 4 | 3 | 98 | 98 | 88 | 60 |
| 5 | 3 | 98 | 98 | 96 | 75 |
| 6 | 3 | 98 | 98 | 87.5 | 70 |
| average | 3 | | | 90.5 | 68.3 |
| 7 | 14 | 98 | 98 | 124.6 | 110 |
| 8 | 14 | 98 | 98 | 110 | 100 |
| 9 | 14 | 98 | 98 | 109 | 75 |
| average | 14 | | | 114.5 | 95 |
| 10 | 30 | 98 | 98 | 130 | 110 |
| 11 | 30 | 98 | 98 | 112.6 | 80 |
| 12 | 30 | 98 | 98 | 140.8 | 120 |
| average | 30 | | | 127.5 | 103.3 |

That which is claimed is:

1. A pressure sensitive adhesive tape comprising a tape substrate having at least a portion of one or more sides coated with a silicone pressure sensitive adhesive which is curable to a permanent adhesive in the presence of moisture, the silicone pressure sensitive adhesive comprising a homogeneous mixture of (A) a silanol-free silicone pressure sensitive adhesive component bearing curing radicals having the formula $$R_b(OR')_{3-b}SiZ-$$

and capping radicals having the formula $$R_3SiO-$$

wherein Z denotes a divalent radical linking the silicon atom of the curing radical to a silicon atom of the silicone pressure sensitive adhesive component, R denotes a monovalent hydrocarbon radical, R' denotes an alkyl or alkoxyalkyl radical, and the subscript b has a value of 0 or 1;

(B) an effective amount of a catalyst component to accelerate the reaction of the curing radicals with moisture to form siloxane bonds; and optionally, (C) an effective amount of a silicon compound bearing a plurality of silicon-bonded alkoxy radicals to improve the shelf life of the adhesive.

2. The pressure sensitive adhesive tape of claim 1 in which (A) the silanol-free silicone pressure sensitive adhesive component bears 1 to 100 millimols of curing radicals per 100 parts by weight of the silicone pressure sensitive adhesive component.

3. The pressure sensitive adhesive tape of claim 2 in which all other silicon bonded radicals of the silanol-free silicone pressure sensitive adhesive component (A) being selected from the group consisting of divalent oxygen atoms linking silicon atoms, hydrogen atoms and monovalent hydrocarbon radicals; and Z radicals are selected from the group consisting of —O—, —CH$_2$CH$_2$—, —CH$_2$CH$_2$SiMe$_2$O—, and —CH$_2$CH$_2$SiMe$_2$OSiMe$_2$O— where Me denotes methyl.

4. The pressure sensitive adhesive tape of claim 1 in which the silicone pressure sensitive adhesive is covered by a release film.

5. The pressure sensitive adhesive tape of claim 4 where the tape is enclosed in a moisture impermeable container.

6. The pressure sensitive adhesive tape of claim 5 in which a desiccant is also enclosed in the moisture impermeable container.

7. The pressure sensitive adhesive tape of claim 6 in which the tape substrate is a silicone elastomer.

8. The pressure sensitive adhesive tape of claim 7 in which two opposing sides of the tape substrate are coated with the silicone pressure sensitive adhesive.

9. The pressure sensitive adhesive tape of claim 8 in which the tape substrate has a rectangular shape in which two opposing adhesive-bearing surfaces are flat or convex with the maximum height of the convex surface less than 1.2 percent of the width of the convex surface, and in which two opposing non-adhesive-bearing surfaces are flat or concave.

10. The pressure sensitive adhesive tape of claim 9 in which all other silicon bonded radicals of the silanol-free silicone pressure sensitive adhesive component (A) being selected from the group consisting of divalent oxygen atoms linking silicon atoms, hydrogen atoms and monovalent hydrocarbon radicals; and Z radicals are selected from the group consisting of —O—, —CH$_2$CH$_2$—, —CH$_2$CH$_2$SiMe$_2$O—, and —CH$_2$CH$_2$SiMe$_2$OSiMe$_2$O— where Me denotes methyl.

11. A method of bonding two articles together with the pressure sensitive adhesive tape of claim 1, the method comprising:

(A) placing the adhesive tape in contact with the two articles so that a surface of each of the two articles is in contact with a portion of the silicone pressure sensitive adhesive, (B) exposing the silicone pressure sensitive adhesive in contact with the articles to moisture until the silicone pressure sensitive adhesive cures to a permanent adhesive.

12. A method of bonding two articles together with the pressure sensitive adhesive tape of claim 9, the method comprising:

(A) applying a non-covered, adhesive-bearing surface of the tape to a surface of the first article (B) removing the release film from the tape, uncovering a second adhesive-bearing surface of the tape, (C) applying a surface of the second article to the second adhesive-bearing surface of the tape with sufficient pressure to obtain adherence between the first article, the tape, and the second article, and (D) exposing the silicone pressure sensitive adhesive in contact with the articles to moisture until the silicone pressure sensitive adhesive cures to a permanent adhesive.

13. The method of claim 12 in which the first article is a curtainwall mullion and the second article is an 14. A method of manufacturing the pressure sensitive adhesive tape of claim 1, the method comprising applying an adhesive-bearing surface of a transfer sheet to the tape substrate, the transfer sheet comprising a release liner coated with a layer of the silicone pressure sensitive adhesive.

15. A method of manufacturing the pressure sensitive adhesive tape of claim 9, the method comprising (A) applying an adhesive-bearing surface of a transfer sheet to the tape substrate, the transfer sheet comprising a release liner coated with a layer of the silicone pressure sensitive adhesive, (B) peeling the release liner off the surface of the silicone pressure sensitive adhesive, (C) covering the surface of the silicone pressure sensitive adhesive with a release film of polyethylene, and then (D) packaging the pressure sensitive adhesive tape in a moisture-impermeable container.

* * * * *